UNITED STATES PATENT OFFICE.

JAMES HENDERSON, OF BELLEFONTE, PENNSYLVANIA, ASSIGNOR TO CHARLES G. FRANCKLYN, OF NEW YORK, N. Y.

MANUFACTURE OF COMPOUNDS FOR FURNACE-LININGS AND FIRE-BRICK.

SPECIFICATION forming part of Letters Patent No. 266,145, dated October 17, 1882.

Application filed September 4, 1882. (No specimens.)

*To all whom it may concern:*

Be it known that I, JAMES HENDERSON, of Bellefonte, county of Centre, State of Pennsylvania, (formerly of New York,) have invented certain new and useful Improvements in the Manufacture of Compounds for Furnace-Linings and Fire-Brick, of which the following is a specification.

The object of my invention is to produce a compound for refractory furnace-linings and fire-brick which shall be extremely refractory or capable of resisting very high and long-continued heats, and which may be applied and produced at very small expense, and are especially useful in the production of iron and steel from impure iron.

In carrying out this my invention I take hydrated magnesian lime and mix it with water to a thick mortar, either with or without a vegetable binding substance from which sugar or starch may be derived; or I may take ordinary hydrated lime and mix it with a compound of glucose and water, as described in another application for Letters Patent now pending, filed on or about May 5, 1882, and form it into blocks, which are dried at the ordinary temperature, and afterward subjected in any suitable furnace or kiln to a temperature high enough to frit or harden the block. Such furnace may be an open-hearth steel-melting furnace, and the block be exposed therein at the highest temperatures for from three to six hours, which treatment causes the lime or magnesian lime prepared as hereinbefore described to frit and contract to the extreme limits of contraction and to become very hard and firm. The lime or magnesian lime, after the treatment above described, is pulverized preferably sufficiently fine to pass through a sieve of about three thousand six hundred meshes to the square inch. To this pulverized lime or magnesian lime in the fritted state I add a compound of a vegetable binding substance from which sugar or starch may be derived and water, preferably glucose, in the proportion of one part of glucose to one and a third part of water, or just enough water to dissolve the glucose. The compound of glucose and water is thoroughly mixed with the fritted lime or magnesian lime to form a thick mortar, when it becomes ready for use, to be applied in the wet state for the walls or linings of hearths of reverberatory furnaces, Bessemer converters, and other metallurgic vessels, which, when dried at the ordinary temperature, is ready for use; or it may be molded into brick, which are ready for use when dried at the ordinary temperature or baked in the usual manner.

If preferred, the lime or magnesian lime may be almost free from other mineral substance, or silica, alumina, oxide of iron, or fluor-spar may be in admixture with it, if not in sufficient amount to impair its refractory properties or capability to resist high temperatures.

The material of a previous operation may be used in admixture with the vegetable binding substance, or glucose, and water, instead of the lime which has been fritted or hardened, as hereinbefore described; or the vegetable binding substance or the glucose and water may be used with hydrated lime or magnesian lime to form a milk of lime, in the proportions of from one (1) to five (5) per cent. of these calcareous substances, by weight, to the fritted lime or magnesian lime, and mixed with it. The compound thus formed possesses all of the advantages of the vegetable binding substance and those derived from the use of the lime or magnesian lime as binding agents.

For the purposes of this invention, cellulose, starch, dextrine, gum-arabic, mucilage, or molasses, with sufficient water to dissolve them, or rye, wheat, or other corn flour, oat, pea, or bean meal, or wood pulp, or other analogous substances from which sugar starch may be derived when made into a thin paste with water, are the equivalents of glucose. I do not, however, wish to be understood as limiting my invention to the proportions hereinbefore given, as more water or less glucose or vegetable binding substance may be used in the compound; but it will not be so firm or strong as when the larger proportions hereinbefore given are used. Nor do I claim as part of this invention the use of magnesian lime in combination with silica, alumina, oxide of iron, or fluor-spar, except when they are used as herein described. Nor do I claim as a part of this invention the use of lime or magnesian lime as a lining for reverberatory furnaces or converters used in the manufacture of iron and steel, as they are already described in Letters Patent No. 106,365, dated August 16, 1870, granted to me.

What I claim, and desire to secure by Letters Patent, is—

1. The process of manufacture of furnace-linings or fire-brick, consisting in subjecting lime or magnesian lime to sufficiently high temperatures to frit or harden it, and, secondly, to pulverize the fritted or hardened lime or magnesian lime and mix it with a vegetable binding substance from which starch or sugar may be derived and water, as specified.

2. The process of manufacture of furnace-linings or fire-brick, consisting in subjecting lime or magnesian lime to sufficiently high temperatures to frit or harden it, and, secondly, to pulverize the fritted or hardened lime or magnesian lime and mix it with glucose and water, as specified.

3. The process of manufacture of furnace-linings or fire-bricks, consisting in subjecting lime or magnesian lime to sufficiently high temperatures to frit or harden it, and, secondly, to pulverize the fritted or hardened lime or magnesian lime and mix it with a compound of glucose, hydrated lime or magnesian lime, and water, as specified.

JAMES HENDERSON.

Witnesses:
SCHUYLER DURYEE,
LEWIS THOMPSON.